United States Patent
Dotan et al.

(10) Patent No.: US 8,955,069 B1
(45) Date of Patent: Feb. 10, 2015

(54) EVENT-BASED BIOMETRIC AUTHENTICATION USING MOBILE DEVICE

(75) Inventors: Yedidya Dotan, Newton, MA (US); Samuel Adams, Andover, MA (US); Philip A. Darringer, Seattle, WA (US); Christopher Corde, Brighton, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,102

(22) Filed: Jun. 29, 2012
(Under 37 CFR 1.47)

(51) Int. Cl.
*G06F 21/00* (2013.01)
*H04L 29/06* (2006.01)

(52) U.S. Cl.
CPC .................................. *H04L 63/0861* (2013.01)
USPC .................................................. 726/6; 726/9

(58) Field of Classification Search
USPC ............................................................ 726/6
See application file for complete search history.

(56) References Cited

U.S. PATENT DOCUMENTS

| | | | |
|---|---|---|---|
| 2007/0186106 A1* | 8/2007 | Ting et al. ...................... | 713/168 |
| 2008/0046366 A1* | 2/2008 | Bemmel et al. .................. | 705/44 |
| 2010/0083000 A1* | 4/2010 | Kesanupalli .................... | 713/186 |
| 2011/0083170 A1* | 4/2011 | Kesanupalli et al. ............. | 726/5 |
| 2013/0227664 A1* | 8/2013 | McKay ............................. | 726/7 |

OTHER PUBLICATIONS

Lindell (Time versus Event Based One-Time Passwords, 2007).*

* cited by examiner

*Primary Examiner* — Michael Chao
*Assistant Examiner* — Shu Chun Gao
(74) *Attorney, Agent, or Firm* — Ryan, Mason & Lewis, LLP

(57) ABSTRACT

Event-based biometric authentication is provided using a mobile device of a user. A user attempting to access a protected resource is authenticated by receiving a request to access the protected resource; collecting biometric information from the user in response to the request using a mobile device of the user; performing biometric authentication of the user using the collected biometric information; and granting access to the protected resource based on the biometric authentication. The authentication optionally comprises an event-based authentication. The mobile device does not have to contain token generating material.

31 Claims, 5 Drawing Sheets

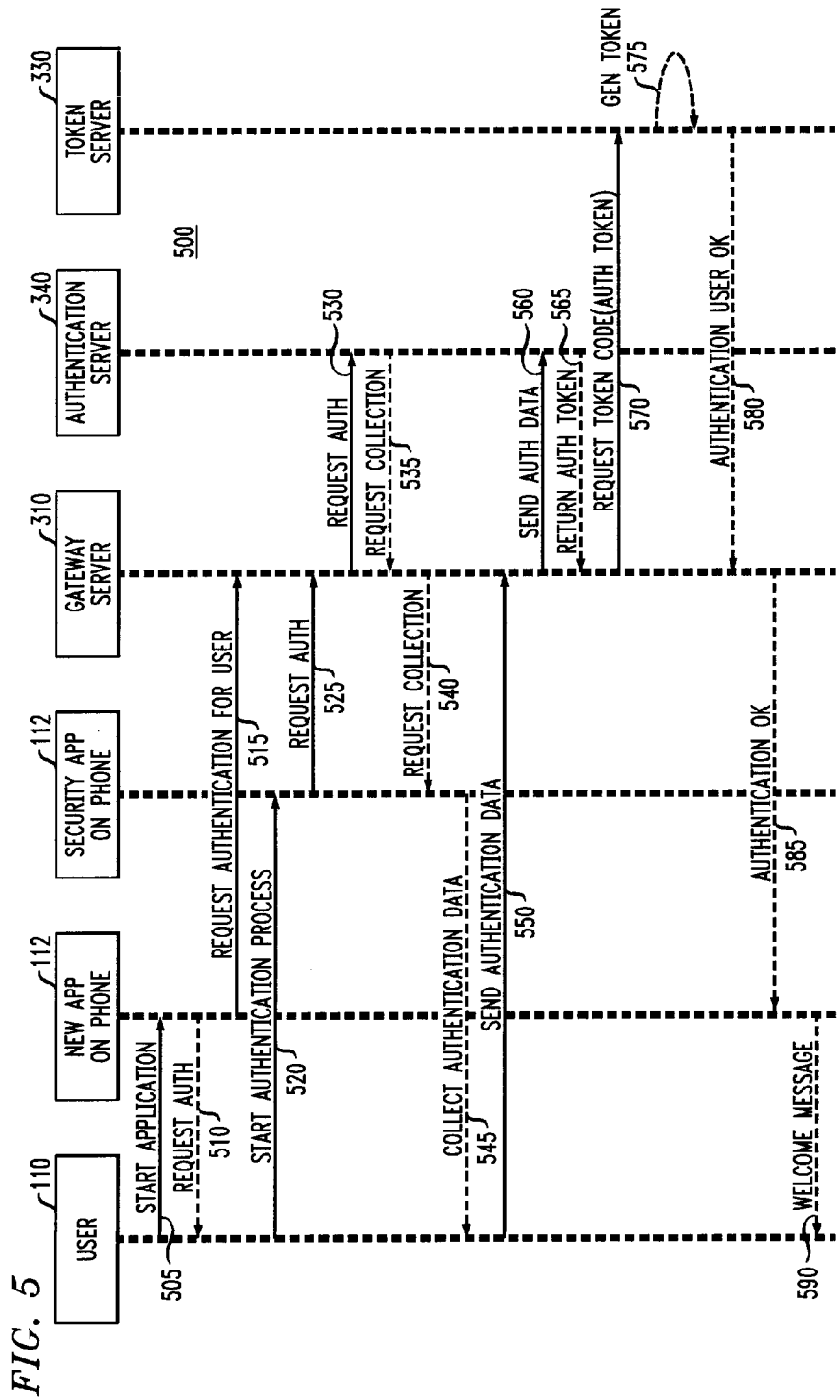

EVENT-BASED BIOMETRIC AUTHENTICATION USING MOBILE DEVICE

CROSS-REFERENCE TO RELATED APPLICATION

The present application is related to U.S. patent application Ser. No. 13/341,160, filed Dec. 30, 2011, entitled "Biometric Authentication with Smart Mobile Device," (now U.S. Pat. No. 8,752,145), incorporated by reference herein.

FIELD OF THE INVENTION

The present invention relates generally to techniques for securing communications over a network and other types of communication systems.

BACKGROUND OF THE INVENTION

Computer networks, such as those provided at a workplace, university, or another organization, are often configured to allow users to gain network access remotely through virtual private networks (VPNs), customized network settings, and/or other technologies. To gain access, users are generally required to authenticate to the remote network. Authentication may involve users providing various authentication factors, such as passwords, token codes, and personal identification numbers (PINs). Remote networks generally include, or have access to, an authentication server. The authentication server receives authentication requests from users and either grants or denies access, based on whether authentication factors provided with the requests match expected values. For added security, networks often require that multiple authentication factors be entered and verified before access can be granted.

A common two-factor authentication scheme involves both a token code and a personal identification number (PIN). The token code, also known as a one-time password, or "OTP," is generated automatically, such as by a portable device that a user has in his or her possession. The PIN is a number, or possibly an alpha-numeric string, that the user has memorized. Both the token and the PIN have been registered previously in connection with the user at the authentication server. The user enters both the token code and the PIN in one or more fields of a network login screen on the user's computer. Access to the remote network is only granted to the user's computer if both the token code (something the user has) and the PIN (something the user knows) can be verified. An example of a portable token is SecurID®, which is available from RSA Security LLC, Bedford, Mass.

Recently, software has been introduced to perform the functions of tokens on smart mobile devices, such as smart phones, personal digital assistants (PDAs), and tablets. See, e.g., RSA SecurID, "Software Authenticators," downloadable form http://www.emc.com/security/rsa-securid/rsa-securid-software-authenticators/iphone-and-ipad.htm. In one example, a user of a computer wishing to access a remote network enters his or her PIN into a field displayed on the user's mobile device. The mobile device sends the PIN to an authentication server. If the PIN matches an expected value, the authentication server sends back a signal to unlock the mobile device to allow the mobile device to display a token code. The user can then transfer the token code manually to the computer to enable the computer to gain access to the remote network.

PINs can be used alone or in combination with token codes or other factors to afford a high level of security. Unfortunately, however, PINs can be inconvenient. For example, users need to register their PINs. In addition, PINs can sometimes compromise security, as users may write down their PINs in presumably safe locations. Malicious parties, however, can sometimes discover and steal the PINs. Furthermore, a user may use only a single PIN for different applications, in an effort to avoid having to remember multiple PINs, thereby increasing the chance that the PIN will be stolen.

U.S. patent application Ser. No. 13/341,160, filed Dec. 30, 2011, entitled "Biometric Authentication with Smart Mobile Device," (now U.S. Pat. No. 8,752,145), incorporated by reference herein, employs the mobile device of a user to obtain picture information of the user and then use the picture information as part of a biometric authentication operation of the user. In some examples, a server stores picture information for different users along with associated PINs. By matching picture information from a user's mobile device with picture information stored on the server, the user's PIN can be obtained, without the user having to register or remember the PIN.

While such biometric authentication techniques using the smart mobile device of the user have avoided some of the inconvenience and potential security risks associated with conventional PINs, a need still remains for event-based authentication techniques that provide improved security. A further need remains for mobile authentication techniques that do not require the token or token generating material to be stored on the mobile device of the user.

SUMMARY OF THE INVENTION

The present invention in the illustrative embodiments described herein provides event-based biometric authentication using a mobile device of a user. In accordance with an aspect of the invention, a method is provided for authenticating a user attempting to access a protected resource. The exemplary method comprises the steps of receiving a request to access the protected resource; collecting biometric information from the user in response to the request using a mobile device of the user; performing biometric authentication of the user using the collected biometric information; and granting access to the protected resource based on the biometric authentication.

In one exemplary embodiment, the protected resource may comprise a resource requiring use of a one-time passcode generating device to obtain access. A security application on the mobile device of the user receives a request to collect the biometric information and provides the biometric information for the biometric authentication. In addition, a given token code is generated and provided to the security application on the mobile device if the biometric authentication is successful. The user can then enter the given token code to access the protected resource.

In another exemplary embodiment, an application associated with the protected resource forwards the request to access the protected resource to a gateway server. A security application on the mobile device of the user forwards an authentication request to a gateway server in response to the request, and the gateway server initiates the collection of biometric information from the user in response to the authentication request. The gateway server then sends a request to the security application to initiate the collection of the biometric information from the user and wherein the gateway server receives the biometric information from the mobile device of the user. The gateway server also provides the received biometric information to an authentication server for biometric authentication. The authentication server requests a given token code from a token server if the biometric authentication is successful. The token server generates a given token code and provides a message to the gateway server granting access to the user.

According to a further aspect of the invention, the authentication optionally comprises an event-based authentication. According to yet another aspect of the invention, the mobile device does not have to contain token generating material. In addition, an additional authentication of the user is optionally performed using at least one additional authentication factor. For example, the additional authentication factor can comprise (i) validating that the mobile device is associated with the user; (ii) evaluation of a certificate from the mobile device to authenticate the mobile device; (iii) knowledge-based authentication of the user; and/or (iv) adaptive authentication of one or more of the user and the mobile device.

The authentication techniques of the illustrative embodiments overcome one or more of the problems associated with the conventional techniques described previously, and permit users to perform improved biometric authentication using a mobile device. These and other features and advantages of the present invention will become more readily apparent from the accompanying drawings and the following detailed description.

BRIEF DESCRIPTION OF THE DRAWINGS

FIGS. 4 and 5 illustrate exemplary authentication processes incorporating features of the present invention.

DETAILED DESCRIPTION

The present invention provides improved event-based biometric authentication techniques. According to one aspect of the invention, mobile authentication techniques are provided that do not require the token to be stored on the mobile device of the user. It is noted that collecting biometric information using the mobile device of a user inherently provides two-factor authentication, as the biometrics establish who the user is, and the mobile device is something the user has.

Particular embodiments will now be disclosed. It is understood that these embodiments are included by way of example only and are not intended as limiting the manner in which the invention hereof may be practiced.

Figure 1:
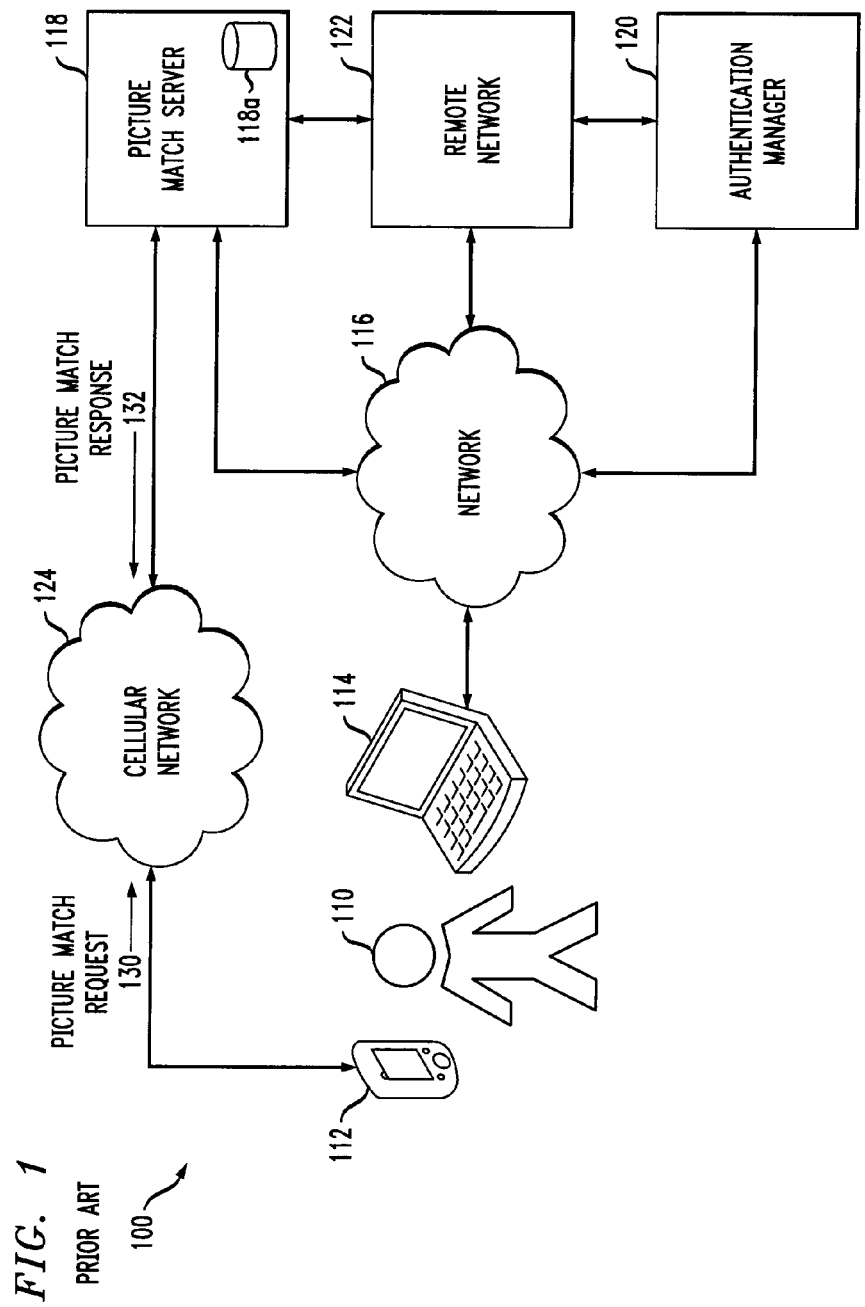
FIG. 1 shows an example environment in which enhanced authentication techniques employing facial recognition may be conducted.

FIG. 1 shows an example environment 100 in which enhanced authentication techniques employing facial recognition may be conducted, in accordance with the teachings of U.S. patent application Ser. No. 13/341,160, filed Dec. 30, 2011, entitled "Biometric Authentication with Smart Mobile Device," (now U.S. Pat. No. 8,752,145). The environment 100 includes a human user 110, a mobile device 112, and a computing device 114. The mobile device 112 is coupled to a cellular telephone network 124, and the computing device 114 is coupled to a network 116, such as the Internet. Also coupled to the network 116 are a picture match server 118, an authentication manager 120, and a remote network 122. The picture match server 118 is also preferably coupled to the cellular network 124.

The mobile device 112 is generally a smart phone, such as an iPhone, Blackberry, Droid, or a similar device; however, the mobile device 112 can be any smart device equipped with a camera and a network connection, which is capable of communicating over the network and running software.

The computing device 114 is the device employed by the user 110 to access resources on the remote network 122. The computing device 114 is therefore generally a computer, such as a desktop or laptop computer. This is not critical, however, and the computing device 114 can be any type of computing device, including a tablet computer or even a smart phone or other mobile device itself.

The picture match server 118 and authentication manager 120 are preferably separate servers. They may be included within the remote network 122 or provided outside the remote network 122. Although the picture match server 118 and authentication manager 120 may be combined on a single computer, they are preferably maintained on physically separate computers, or even on separate networks, for enhanced security.

Figure 2:
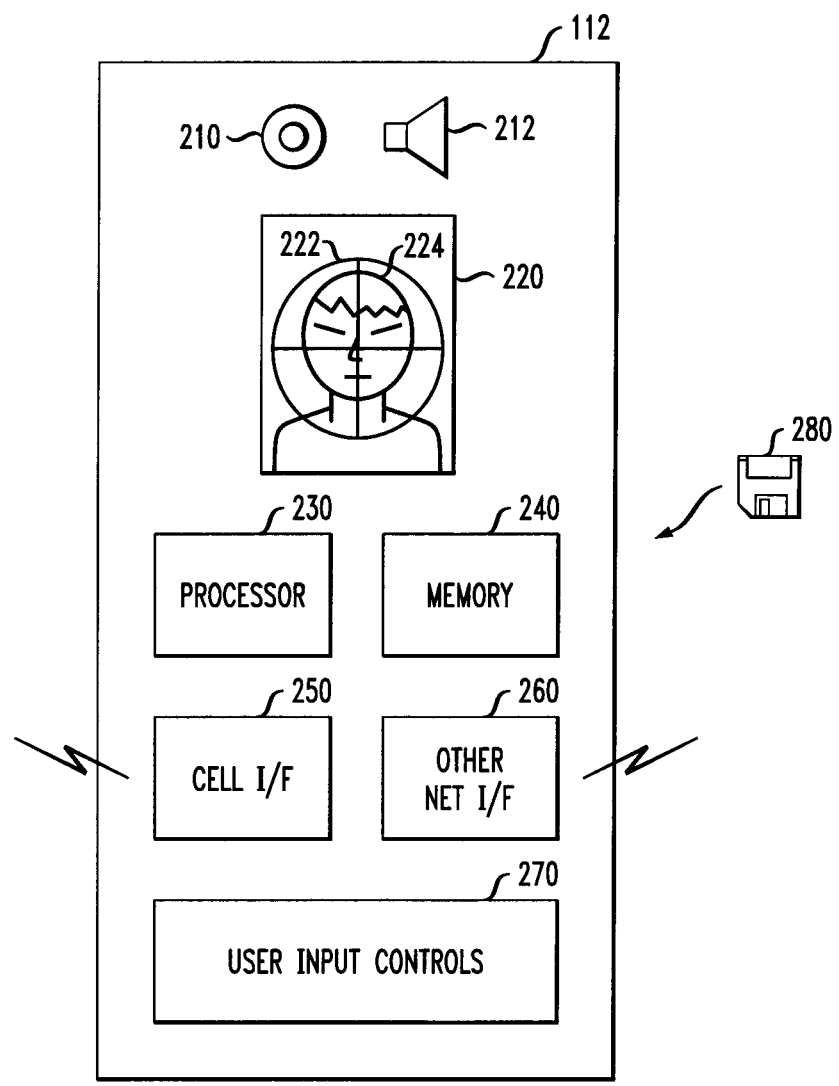
FIG. 2 shows an example mobile device.

FIG. 2 shows an example mobile device 112. The mobile device 112 includes a camera 210, a speaker 212, and a display area 220. The mobile device 112 also generally includes a processor 230, memory 240, a cell interface 250, e.g., for communicating wirelessly over the cellular network 124, and another network interface 260, e.g., for communicating wirelessly over the network 116. User input controls 270, such as buttons and/or a touchpad are also included to allow the user 110 to enter data, such as numbers, letters, and other characters, into the mobile device 112. The mobile device 112 runs program code including a security application (e.g., an "app"). The app is used to acquire and process pictures of the user 110 and to provide a soft token code that the computing device 114 uses to access the remote network 122. The app is stored in the memory 240 and is executed on the processor 230.

When running the app on the mobile device 112, the user 110 sees an image 224 of himself or herself on the display 220, enabling the user to take a picture. Also, the app preferably displays an indicator 222. The indicator is superimposed on the image 224 of the user 110 and designates where the user should position his or her face on the display 220 for best photographic results. If the mobile device 112 is equipped only with a rear-facing camera, the mobile device 112 may alternatively generate an audible signal from the speaker 212, which directs the user to properly position his or her face relative to the field of view of the camera 210. The audible signal can take a number of forms, such as beeps issued as the user's face becomes properly aligned, and spoken instructions to direct the user to adjust the camera position, e.g., "left," "right," "up," and "down."

To initiate an authentication request to the remote network 122, the user 110 opens an application on the computing device 114 to start a VPN client program. The application presents a log-in screen that displays fields into which the user 110 is directed to enter information, such as the user's user ID, a SecurID® token code, and a PIN, for example. The user 110 then accesses the mobile device 112 and starts the app. The app directs the user 110 to take a picture. The user 110 points the camera (or one of the cameras, where there are more than one) at his or her face and takes a picture. The app on the mobile device 112 processes the picture and extracts facial geometry from the image of the user's face.

The facial geometry may include a large number of reference points, or landmarks, from which the relative size, shape, and position of facial features may be computed. The greater the number of landmarks acquired, the greater the uniqueness of any individual's facial geometry. Previous work has shown that facial geometry is highly specific to each individual, and the chance of any two individuals, other than identical twins, having the same, or even closely matching, facial geometry is very low. Facial geometry is stored in the mobile device 112 in the form of a data set, which may be provided in a single file, such as a bitmap.

With the picture taken and the facial geometry extracted, the mobile device 112 sends a picture match request 130 to the picture match server 118. The picture match request 130 includes the facial geometry acquired for the picture just taken, as well as a direction for the picture match server 118 to compare the facial geometry with records of facial geometry stored on the picture match server 118.

The picture match server 118 includes a database 118a. The database 118a of the picture match server 118 can be constructed in any suitable way, but generally includes a different record for each user of the remote network 122. Each record stores, for example, the following fields:

an identifier of the user (e.g., an employee number or organization-issued ID number);

an identifier of the user's mobile device (e.g., an IMSI code);

the user's PIN; and a set of facial geometry previously obtained from a picture of the user.

Most large companies and many organizations require users to obtain photo ID cards. In one example, facial geometry for populating the database 118a can be extracted conveniently from these photo ID cards, at no additional burden to users. In other examples, facial geometry for users may be obtained by other means, such as by separately photographing users or by having users photograph themselves with their own mobile devices and register their pictures with the picture server 118.

The picture match server 118 compares the facial geometry conveyed with the picture match request 130 with one or more records of facial geometry stored in the database 118a to determine whether there is a match, i.e., whether the facial geometry of the user substantially matches the facial geometry associated with the user, or with any of the users, whose facial geometry is stored in the database 118a. The picture match server 118 then issues a picture match response 132, which is sent back to the mobile device 112, preferably via the cellular network 124. The picture match response, which can include a PIN, a command, or other information, can then be used as part of an authentication operation by the user 110 to provide the computing device 114 with access to the remote network 122.

Preferably, the picture match request 130 is sent to the picture match server 118 via the cellular network 124. Although the mobile device 112 may support other networks, such as the network 116, the cellular network 124 is generally preferred for sending the picture match request 130, as the cellular network 124 is separate from the network 116 and thus provides an added measure of security (e.g., a malicious user on the network 116 monitoring the computing device 114 would not necessarily also be monitoring the same cell phone network 124 and coordinating traffic from the two sources).

Figure 3:
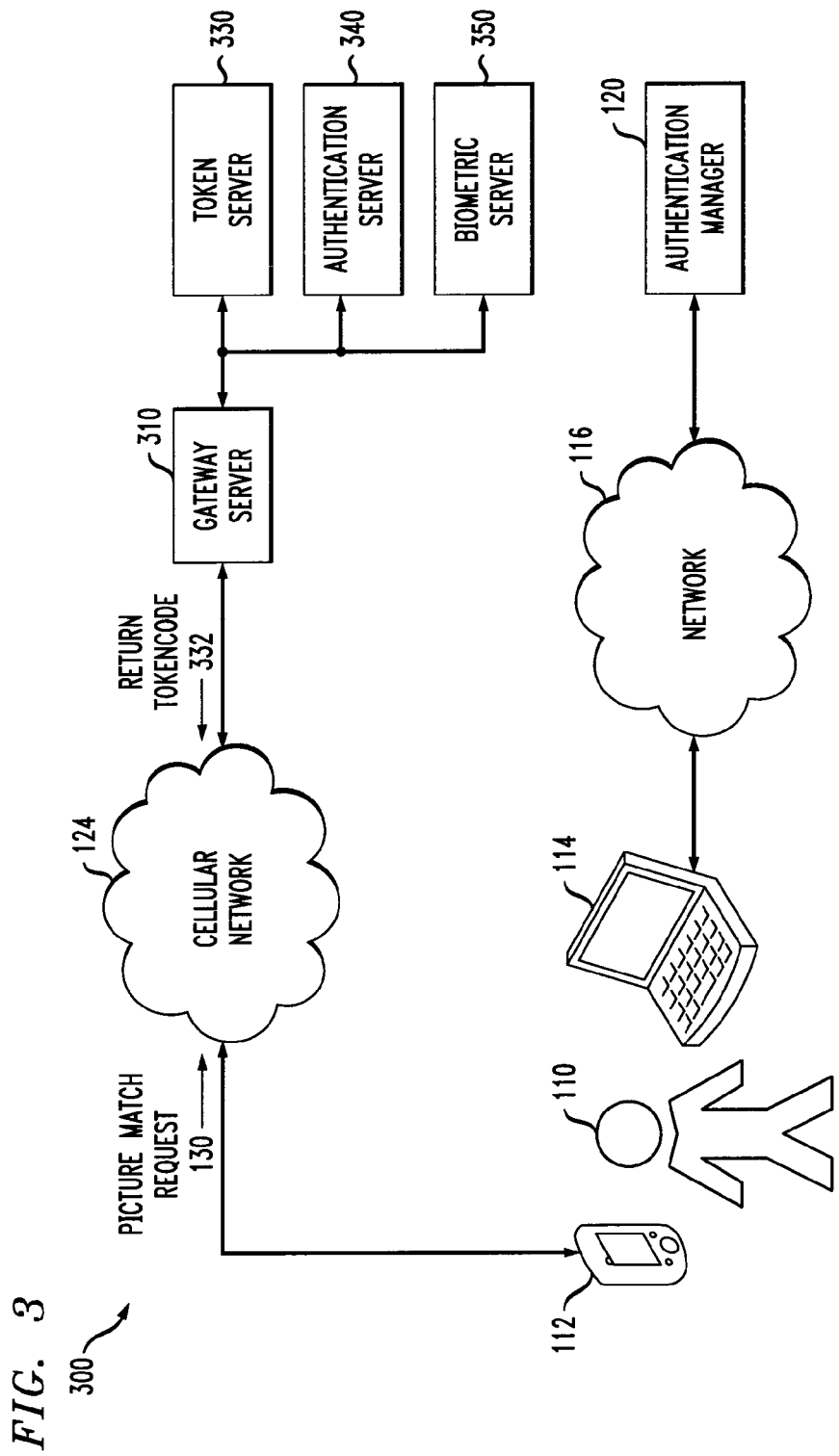
FIG. 3 shows an example environment in which biometric authentication in accordance with the present invention may be conducted.

FIG. 3 shows an exemplary environment 300 in which biometric authentication in accordance with the present invention can be performed. The like-numbered elements from FIG. 3 that are also shown in FIG. 1 operate in a similar manner to the above discussion in conjunction with FIG. 1.

In addition, as shown in FIG. 3, the exemplary environment 300 further comprises a gateway server 310, a token server 330, an authentication server 340, and a biometric server 350. Generally, the gateway server 310 serves as a gateway for communications between the mobile device 112 and various servers 330, 340, and 350. The token server 330 generates token codes and releases token codes to the mobile devices 112. The authentication server 340 can implement, for example, adaptive authentication to evaluate the location of the mobile device 112 and/or whether the mobile device 112 is associated with the user 110.

The biometric server 350 may be implemented in a similar manner as the picture match server 118 of FIG. 1. Generally, the biometric server 350 receives biometric information from the mobile device 112 of the user 110 and performs biometric authentication of the user 110.

As shown in FIG. 3 and as discussed further below in conjunction with FIGS. 4 and 5, once the user 110 and/or the mobile device 112 are authenticated, a token code 332 is returned to the user 110. For example, if the biometric authentication is a match, one or more of a key, a PIN and an unlock code can be provided to the user 110 and/or the mobile device 112.

Figure 4:
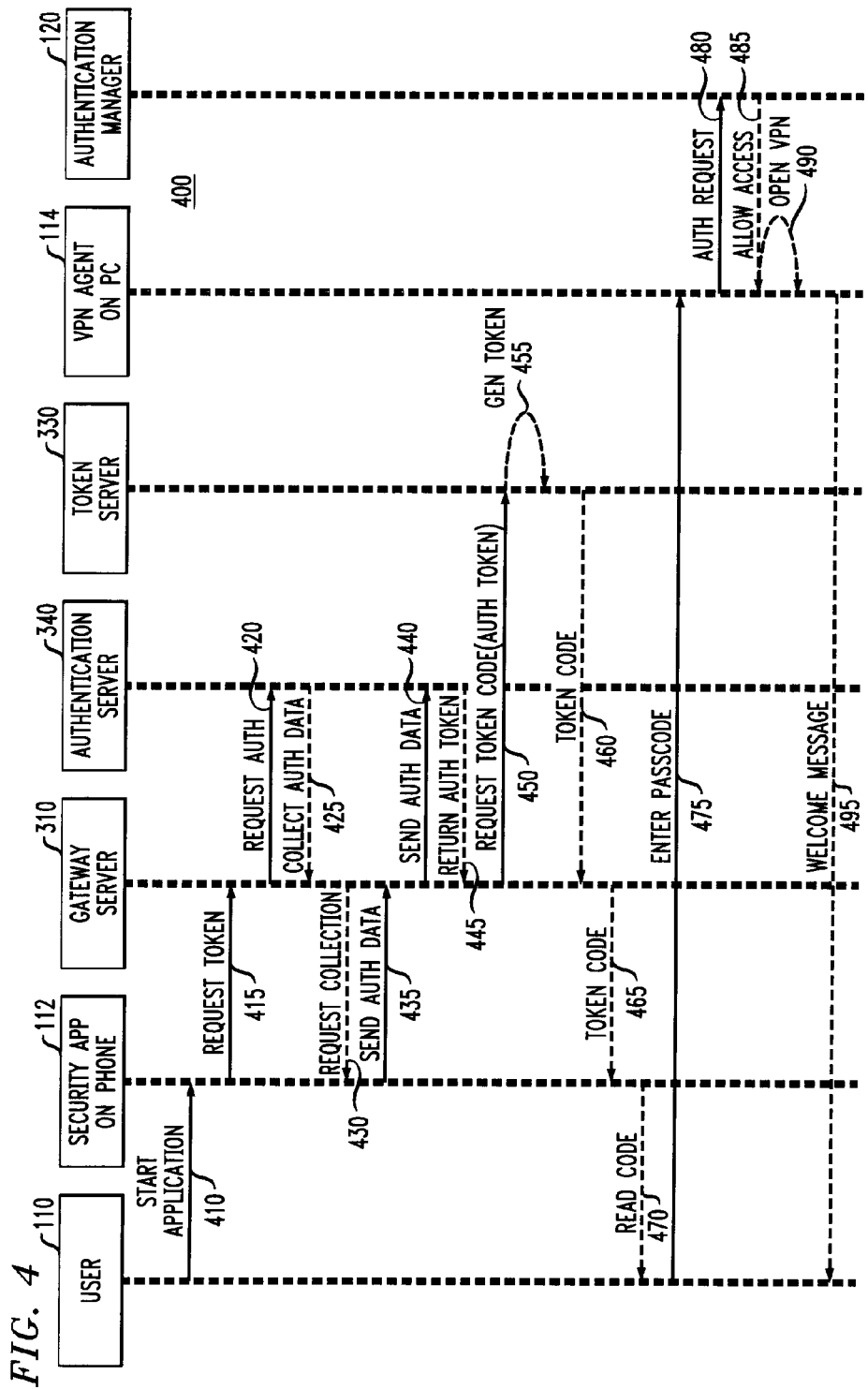

FIG. 4 illustrates communications among various system elements 110, 112, 310, 340, 330, 114, and 120 of FIG. 3 at particular points in time for an exemplary biometric authentication process incorporating aspects of the present invention. As shown in FIG. 4, at time 410, the user 110 starts an application with a security application (app) on the mobile device 112. Thereafter, at time 415, the security app on the mobile device 112 requests a token from the gateway server 310, which in turn, requests the authentication server 340 at time 420 to determine if the user 110 is authentic. The authentication performed by the authentication server 340 may be, for example, one or more of biometric authentication, cryptographic authentication, certificate authentication, knowledge-based authentication and adaptive authentication.

For a more detailed discussion of suitable biometric authentication systems, see for example, U.S. patent application Ser. No. 13/341,160, filed Dec. 30, 2011, entitled "Biometric Authentication with Smart Mobile Device,"(now U.S. Pat. No. 8,752,145), incorporated by reference herein. For a more detailed discussion of suitable Adaptive Authentication systems, see for example. U.S. patent application Ser. No. 13/246,937, filed Sep. 28, 2011, entitled "Using Baseline Profiles In Adaptive Authentication" (now U.S. Pat. No. 8,621,586) and/or U.S. patent application Ser. No. 12/751,057, filed Mar. 31, 2010 entitled "Techniques for Authenticating Users of Massive Multiplayer Online Role Playing Games Using Adaptive Authentication," (now U.S. Pat. No. 8,370,389), each incorporated by reference herein.

For a more detailed discussion of suitable knowledge-based authentication systems, see for example, U.S. patent application Ser. No. 13/436,125, filed Mar. 30, 2012, entitled "Methods and Apparatus for Fraud Detection and Remediation in Knowledge-Based Authentication," incorporated by reference herein.

Cryptographic authentication and certificate authentication are well-known to those of ordinary skill in the art.

At time 425, the authentication server 340 sends a request to the gateway server 310 to collect authentication data. The gateway server 310, in turn, sends a collection request to the security app on the mobile device 112 at time 430. The collection request may comprise, for example, one or more of biographical information, mobile device data, or adaptive authentication information. The security app on the mobile device 112 sends the collected authentication data at time 435 to the gateway server 310, which sends it to the authentication server 340 at time 440. The authentication server 340 evaluates the collected authentication data and if the user 110 is authenticated, returns an authentication token to the gateway server 310 at time 445. The authentication server 340 can be implemented, for example, using RSA Adaptive Authentication and the techniques described in U.S. patent application Ser. No. 13/246,937, filed Sep. 28, 2011, entitled "Using Baseline Profiles In Adaptive Authentication" (now U.S. Pat. No. 8,621,586) and/or U.S. patent application Ser. No. 12/751,057, filed Mar. 31, 2010, entitled "Techniques for Authenticating Users of Massive Multiplayer Online Role Playing Games Using Adaptive Authentication," (now U.S. Pat. No. 8,370,389), each incorporated by reference herein.

Thereafter, the gateway server 310 requests a token code (e.g., an authentication token) from the token server 330 at time 450. The token server 330 generates a token and returns the token code to the gateway server 310 at time 460. It is noted that the token server 330 can optionally employ the split-key techniques referenced below and/or detect tampering of the mobile device 112 or communications using the tamper detection techniques referenced below. The gateway server 310 then forwards the token code to the security app on the mobile device 112 at time 465.

The user reads the token code at time 470 and enters the code on an exemplary VPN agent on computing device 114 at time 475. The authentication request is provided to the authentication manager 120 at time 480, in a known manner, and the VPN agent is allowed access at time 485. A VPN session is opened, and the user receives a welcome message at time 495.

For a more detailed discussion of suitable techniques for notifying the authentication manager 120 of tampering with the mobile device 112 or a photograph, see for example, U.S. patent application Ser. No. 13/404,780, filed Feb. 24, 2012, entitled "Method and Apparatus for Embedding Auxiliary Information in One-Time Passcode Authentication Tokens," incorporated by reference herein.

FIG. 5 illustrates communications among various system elements 110, 112, 310, 340, 330, of FIG. 3 at particular points in time for an exemplary alternative biometric authentication process incorporating aspects of the present invention. As shown in FIG. 5, at time 505, the user 110 starts an app on the mobile device 112 or another device. The app on the mobile device 112 responds to the user at time 510 requesting authentication. The app on the mobile device 112 also sends a request for authentication of the user to the gateway server 310 at time 515. Meanwhile, the user 110 starts an authentication process with the security app on the mobile device 112 at time 520, prompting the security app on the mobile device 112 to request authentication with the gateway server 310 at time 525.

At time 530, the gateway server 310 sends an authentication request to the authentication server 340. The authentication performed by the authentication server 340 may be, for example, one or more of biometric authentication, cryptographic authentication, certificate authentication, knowledge-based authentication and adaptive authentication, in a similar manner to FIG. 4.

At time 535, the authentication server 340 sends a request to the gateway server 310 to collect authentication data. The gateway server 310, in turn, sends a collection request to the security app on the mobile device 112 at time 540. The collection request may comprise, for example, one or more of biographical information, mobile device data, or adaptive authentication information. The security app on the mobile device 112 sends the request to collect authentication data to the user 110 at time 545. The user 110 sends the collected authentication data to the gateway server 310 at time 550, which in turn sends it to the authentication server 340 for evaluation at time 560. It is noted that the gateway server 310 can optionally embed an alert in a message to the 340 to alter the authentication server 340 of a potential compromise, as described in U.S. patent application Ser. No. 13/249,957, filed Sep. 30, 2011, entitled "Methods and Apparatus for Secure and Reliable Transmission of Messages Over a Silent Alarm Channel," and/or U.S. patent application Ser. No. 13/404,788, filed Feb. 24, 2012, entitled "Methods and Apparatus for Silent Alarm Channels Using One-Time Passcode Authentication Tokens," each incorporated by reference herein.

The authentication server 340 evaluates the collected authentication data and if the user 110 is authenticated, returns an authentication token to the gateway server 310 at time 565. The gateway server 310 then requests a token code at time 570 from the token server 330. The token server 330 generates the token code and returns it to the gateway server 310 at time 580 indicating that the user has been authenticated. The new app on the mobile device 112 is notified of the authentication at time 585, and the user 110 receives a welcome message at time 590.

The app running on the mobile device 112 is preferably equipped with safeguards to ensure that the picture of the user 110 is authentic. These safeguards operate to prevent a malicious user from gaining unauthorized access to the remote network 122 by using the mobile device 112 to take a picture of a photograph or video of the user 110. A variety of safeguards may be used.

In one example, the camera 210 on the mobile device 112 is directed to take a sequence of pictures of the user at high frequency and to search for small, rapid changes in the user's skin color. These changes correspond to the user's pulse, with small changes alternatively toward red and blue at the proper frequency indicating the ebb and flow of oxygenated blood. If the sequence of pictures reveals this variable coloration pattern, the subject of the picture is most likely a living being as opposed to a picture.

Another safeguard monitors infra-red light emitted by the subject of the picture. Although infra-red light is generally regarded as an undesirable side effect of electronic photography, infra-red light can be used to advantage in verifying picture authenticity, as human faces, and not pictures of human faces, give off infrared light in a known pattern.

Yet another safeguard applies geographic information about the user 110. It is common for mobile devices 112 to track their geographic locations. Geographic location can be used as a safeguard to refuse authentication attempts if the mobile device 112 reports that it is outside its home country or state, or even if it is in some unexpected location.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, although the examples described above employ facial geometry, other forms of biometric information can be used. These include voice information and fingerprint information, for example. Rather than the mobile device 112 taking a picture of the user 110, the mobile device 112 can instead obtain a fingerprint or voice sample of the user 110, which it converts to a data set for comparison with data sets stored in connection with different users in the database 118a.

Also, although the mobile device 112 is described as a general-purpose device, such as a smart phone, PDA, tablet, and the like, it can also be a special purpose device, such as a key fob modified to include a camera, a processor, and memory. According to yet another variant, the mobile device 112 is itself a computer, such as a laptop computer. In some embodiments, the mobile device 112 can be the same as the computing device 114.

Also, although the security program running on the mobile device 112 is specified as being an "app," this is merely an example. The program can be any software construct running on the mobile device 112.

Although one or more examples described herein involve the use of VPN to access the remote network 122, this is also merely an example. The techniques described can be used in connection with a wide range of other technologies, such as web technology, remote desktop programs, and others.

Further, although the above-described techniques use the mobile device 112 to extract facial geometry from a picture of the user, this is just an example. Alternatively, a file or data stream representing the picture itself can be sent to the picture match server 118, and the picture match server 118 can extract the user's facial geometry remotely.

Also, although the PIN is described as an independent field of the database 118a, alternatively, the PIN may be computed from the facial geometry. For example, it can be a hash code of the facial geometry.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 280 in FIG. 2). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

The disclosed biometric authentication techniques permit users to authenticate using a mobile device without requiring token generating material to be stored on the mobile device. In a further variation, however, portions of a key can be stored on the mobile device 112, and further portions of the key can be stored on a cloud or another storage medium, using the split-key techniques described, for example, in U.S. patent application Ser. No. 13/404,737, filed, Feb. 24, 2012, entitled, "Method and Apparatus for Authenticating a User Using Multi-Server One-Time Passcode Verification," incorporated by reference herein. As previously indicated, the above-described embodiments of the invention are presented by way of illustrative example only. Numerous variations and other alternative embodiments may be used.

Numerous other known password protection techniques can be used in conjunction with the present invention. Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments will be described below in the context of passwords, it is to be appreciated that the invention is more broadly applicable to any other type of authentication information.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

It should again be emphasized that the particular security techniques described above are provided by way of illustration, and should not be construed as limiting the present invention to any specific embodiment or group of embodiments. For example, the particular configuration of system elements shown in FIG. 3, and their interactions as shown in FIGS. 4 and 5 may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authentication of a user attempting to access a protected resource, comprising the steps of:
   receiving a request to access said protected resource, wherein said protected resource comprises a resource requiring use of a token code generated by a one-time passcode generating device to obtain access;
   collecting biometric information from said user in response to said request using a mobile device of said user;
   collecting one or more of biographical information of said user, a geographic location of said user, a geographic location of said mobile device, additional mobile device data and adaptive authentication information;
   performing biometric authentication of said user using said collected biometric information and at least one additional authentication of said user using said one or more of said biographical information of said user, said geographic location of said user, said geographic location of said mobile device, said additional mobile device data and said adaptive authentication information, wherein one or more of said biometric authentication and said at least one additional authentication comprise an event-based authentication; and
   providing a given token code to said mobile device granting access of said mobile device to said protected resource, wherein said given token code is provided based on an outcome of said biometric authentication and said at least one additional authentication.

2. The method of claim 1, wherein a security application on said mobile device receives a request to collect said biometric information and provides said biometric information for said biometric authentication.

3. The method of claim 1, further comprising the steps of generating said given token code and providing said given token code to a security application on said mobile device if said biometric authentication is successful.

4. The method of claim 3, further comprising the step of said user entering said given token code to access said protected resource.

5. The method of claim 1, wherein an application associated with said protected resource forwards said request to access said protected resource to a gateway server.

6. The method of claim 1, wherein a security application on said mobile device of said user forwards an authentication request to a gateway server in response to said request.

7. The method of claim 6, wherein said gateway server initiates said step of collecting said biometric information from said user in response to said authentication request.

8. The method of claim 7, wherein said gateway server sends a request to said security application to initiate said collection of said biometric information from said user and wherein said gateway server receives said biometric information from said mobile device of said user.

9. The method of claim 8, wherein said gateway server provides said received biometric information to an authentication server for said biometric authentication.

10. The method of claim 9, wherein said authentication server requests said given token code from a token server if said biometric authentication is successful.

11. The method of claim 10, wherein said token server generates said given token code and provides a message to said gateway server granting access to said user.

12. The method of claim 1, wherein said mobile device does not contain token generating material.

13. The method of claim 1, wherein said step of collecting biometric information further comprises the step of obtaining a picture of the user with a camera of said mobile device.

14. The method of claim 1, wherein said step of performing biometric authentication further comprises the steps of obtaining picture information from the picture of the user; sending the picture information to a server that stores picture information in connection with a plurality of users; receiving a picture match response back from the server, the picture match response indicating whether the picture information from the picture matches the picture information stored on the server; and using the picture match response as part of an authentication operation of the user.

15. A non-transitory machine-readable storage medium for storing one or more software programs for use in secured communications, wherein the one or more software programs when executed by one or more processing devices implement the following steps:
receiving a request to access a protected resource, wherein said protected resource comprises a resource requiring use of a token code generated by a one-time passcode generating device to obtain access;
collecting biometric information from said user in response to said request using a mobile device of said user;
collecting one or more of biographical information of a user, a geographic location of said user, a geographic location of said mobile device, additional mobile device data and adaptive authentication information;
performing biometric authentication of said user using said collected biometric information and at least one additional authentication of said user using said one or more of said biographical information of said user, said geographic location of said user, said geographic location of said mobile device, said additional mobile device data and said adaptive authentication information, wherein one or more of said biometric authentication and said at least one additional authentication comprise an event-based authentication; and
providing a given token code to said mobile device granting access of said mobile device to said protected resource, wherein said given token code is provided based on an outcome of said biometric authentication and said at least one additional authentication.

16. The method of claim 1, wherein said given token code is used for authentication of said user.

17. An apparatus for authentication of a user attempting to access a protected resource, comprising:
a memory; and
at least one processor, coupled to the memory, operative to implement the following steps:
receiving a request to access said protected resource, wherein said protected resource comprises a resource requiring use of a token code generated by a one-time passcode generating device to obtain access;
collecting biometric information from said user in response to said request using a mobile device of said user;
collecting one or more of biographical information of said user, a geographic location of said user, a geographic location of said mobile device, additional mobile device data and adaptive authentication information;
performing biometric authentication of said user using said collected biometric information and at least one additional authentication of said user using said one or more of said biographical information of said user, said geographic location of said user, said geographic location of said mobile device, said additional mobile device data and said adaptive authentication information, wherein one or more of said biometric authentication and said at least one additional authentication comprise an event-based authentication; and
providing a given token code to said mobile device granting access of said mobile device to said protected resource, wherein said given token code is provided based on an outcome of said biometric authentication and said at least one additional authentication.

18. The apparatus of claim 7, wherein a security application on said mobile device receives a request to collect said biometric information and provides said biometric information for said biometric authentication.

19. The apparatus of claim 7, further comprising the steps of generating said given token code and providing said given token code to a security application on said mobile device if said biometric authentication is successful.

20. The apparatus of claim 19, further comprising the step of said user entering said given token code to access said protected resource.

21. The apparatus of claim 17, wherein an application associated with said protected resource forwards said request to access said protected resource to a gateway server.

22. The apparatus of claim 17, wherein a security application on said mobile device of said user forwards an authentication request to a gateway server in response to said request.

23. The apparatus of claim 22, wherein said gateway server initiates said step of collecting said biometric information from said user in response to said authentication request.

24. The apparatus of claim 23, wherein said gateway server sends a request to said security application to initiate said collection of said biometric information from said user and wherein said gateway server receives said biometric information from said mobile device of said user.

25. The apparatus of claim 24, wherein said gateway server provides said received biometric information to an authentication server for said biometric authentication.

26. The apparatus of claim 25, wherein said authentication server requests said given token code from a token server if said biometric authentication is successful.

27. The apparatus of claim 26, wherein said token server generates said given token code and provides a message to said gateway server granting access to said user.

28. The apparatus of claim 17, wherein said mobile device does not contain token generating material.

29. The apparatus of claim 17, wherein said step of collecting biometric information further comprises the step of obtaining a picture of the user with a camera of said mobile device.

30. The apparatus of claim 17, wherein said step of performing biometric authentication further comprises the steps of obtaining picture information from the picture of the user; sending the picture information to a server that stores picture information in connection with a plurality of users; receiving a picture match response back from the server, the picture match response indicating whether the picture information from the picture matches the picture information stored on the server; and using the picture match response as part of an authentication operation of the user.

31. The apparatus of claim 17, wherein said given token code is used for authentication of said user.

\* \* \* \* \*

UNITED STATES PATENT AND TRADEMARK OFFICE
CERTIFICATE OF CORRECTION

PATENT NO.        : 8,955,069 B1                                        Page 1 of 1
APPLICATION NO.   : 13/538102
DATED             : February 10, 2015
INVENTOR(S)       : Yedidya Dotal et al.

It is certified that error appears in the above-identified patent and that said Letters Patent is hereby corrected as shown below:

In the specification

Column 1, line 54, replace "RSA SecurID" with --RSA SecurID®--.

Column 6, line 52, add the following after "Authentication,"" --(now U.S. Pat. No. 9,021,553),--.

Column 7, line 33, add the following after "Authentication Tokens,"" --(now U.S. Pat. No. 8,984,609),--.

Column 8, line 6, add the following after "Alarm Channel,"" --(now U.S. Pat. No. 8,788,817),--.

In the claims

Column 12, in Claim 18, line 43, replace "claim 7" with --claim 17--.

Column 12, in Claim 19, line 47, replace "claim 7" with --claim 17--.

Signed and Sealed this
Twenty-fourth Day of May, 2016

Michelle K. Lee
*Director of the United States Patent and Trademark Office*